(12) United States Patent
Uimonen et al.

(10) Patent No.: US 8,205,902 B2
(45) Date of Patent: Jun. 26, 2012

(54) TROLLEY-LIKE FOLDING BICYCLE

(75) Inventors: Joakim Uimonen, Taipei Hsien (TW); Joshua Hon, Taipei Hsien (TW)

(73) Assignee: Joshua Hon, Taipei Hsien (TW)

( * ) Notice: Subject to any disclaimer, the term of this patent is extended or adjusted under 35 U.S.C. 154(b) by 0 days.

(21) Appl. No.: 13/197,200

(22) Filed: Aug. 3, 2011

(65) Prior Publication Data
US 2012/0056399 A1 Mar. 8, 2012

(30) Foreign Application Priority Data
Sep. 7, 2010 (TW) .............................. 99130209 A

(51) Int. Cl.
*B62K 1/00* (2006.01)
(52) U.S. Cl. ....................................... 280/278; 280/287
(58) Field of Classification Search .................. 280/278, 280/287
See application file for complete search history.

(56) References Cited

U.S. PATENT DOCUMENTS

| | | | | |
|---|---|---|---|---|
| 4,182,522 | A * | 1/1980 | Ritchie | 280/278 |
| 6,364,335 | B1 * | 4/2002 | Mombelli | 280/287 |
| 6,425,598 | B2 * | 7/2002 | Murayama | 280/278 |
| 7,175,192 | B1 * | 2/2007 | Lu | 280/287 |
| 7,341,270 | B1 | 3/2008 | Scholz | |
| 7,591,473 | B2 | 9/2009 | Hon et al. | |
| 2006/0175797 | A1 * | 8/2006 | Sanders | 280/287 |
| 2007/0018422 | A1 * | 1/2007 | Pan | 280/287 |
| 2008/0224441 | A1 * | 9/2008 | Lu | 280/278 |
| 2011/0025016 | A1 * | 2/2011 | Waaijer | 280/287 |

FOREIGN PATENT DOCUMENTS

| | | |
|---|---|---|
| EP | 1810917 D1 | 7/2007 |
| FR | 2936773 D2 | 4/2010 |
| GB | 2435863 D3 | 9/2007 |

* cited by examiner

*Primary Examiner* — Tashiana Adams
(74) *Attorney, Agent, or Firm* — Bacon & Thomas, PLLC

(57) ABSTRACT

A trolley-like folding bicycle that mainly includes a bicycle frame, a folding device, a transmission gear, a draw bar, and a draw wheel set is disclosed. With the operation of the folding device, the present invention has a usage state and a folded state. When the present invention is in the folded state, the user can draw the trolley-like folding bicycle by simply turning the folded bicycle body upright such that the draw wheel set contacts the ground and then pulling the draw bar. At this stage, an axis formed with the draw bar is substantially perpendicular to a draw rotation axis formed with small wheels of the draw wheel set. The user can move the trolley-like folding bicycle by simply pulling the draw bar, as easily as drawing a luggage case.

20 Claims, 6 Drawing Sheets

TROLLEY-LIKE FOLDING BICYCLE

BACKGROUND OF THE INVENTION

1. Field of the Invention

The present invention relates to a folding bicycle.

2. Description of the Related Art

A folding bicycle has to be moved sometimes after it is folded. Several techniques of combining small wheels and a folding bicycle have been disclosed to facilitate moving the folding bicycle after it is folded. For example, U.S. Pat. No. 7,591,473 discloses a folding bicycle. The rear seat frame of the folding bicycle has four small wheels. When the bicycle is in a usage state, the small wheels are on the rear seat frame (above the rear wheel). When a user wants to fold the bicycle, he or she rotates the rear wheel through 180 degrees around a hinge axle such that the small wheels contact the ground. This motion folds the rear wheel and makes the small wheels contact the ground so that the folded bicycle can be moved with the small wheels. However, when the user wants to pull the folded bicycle, he or she has to bend down, which makes him or her uncomfortable. Also, due to the design of the rolling direction of the small wheels, the folded bicycle tends to tip to the left or right. Thus the user has to balance the folded bicycle with more wrist force when pulling the folded bicycle. This may hurt the user's wrists.

In addition, U.S. Pat. No. 7,341,270 discloses a carrier rack of a folding bicycle equipped with two small wheels. When it is desired to use the small wheels, a user has to collapse the carrier rack and then turn the carrier rack toward the ground such that the small wheels contact the ground. The design of the carrier rack is complicated, and the height of the carrier rack is too great and is not the best design of a carrier rack. Moreover, the user also has to bend down to pull the folded bicycle, which is uncomfortable. Furthermore, because the two small wheels are located above the rear wheel when the bicycle is unfolded and below the rear wheel when the bicycle is folded, the width is too great to allow the bicycle to be moved conveniently (e.g., when passing through the entrance of public transportation station or the door of a train).

Therefore, it is desirable to provide a folding bicycle which can be easily drawn, preferably like a luggage case. Such a folding bicycle allows a user to draw it in a comfortable way and will not tilt easily when being drawn. Also, the width of such a folding bicycle should not be too great when the folding bicycle is drawn.

SUMMARY OF THE INVENTION

It is an object of the present invention to provide a trolley-like folding bicycle which can be easily drawn like a luggage case after being folded.

It is another object of the present invention to provide a trolley-like folding bicycle which can be drawn vertically and which has a draw bar.

It is still another object of the present invention to provide a trolley-like folding bicycle with a draw wheel set such that the trolley-like folding bicycle can stand upright on the ground simply with cushion blocks of the draw wheel set.

To achieve the aforementioned objects, the present invention provides a trolley-like folding bicycle, which mainly comprises a bicycle frame, a folding device, a transmission gear, a draw bar, and a draw wheel set. With the operation of the folding device, the present invention has a usage state and a folded state. When the present invention is in the folded state, the user can draw the trolley-like folding bicycle by simply turning the folded bicycle body upright such that the draw wheel set contacts the ground and then pulling up the draw bar. At this stage, an axis formed with the draw bar is substantially perpendicular to a draw rotation axis formed with the small wheels of the draw wheel set. The user can move the trolley-like folding bicycle by simply pulling the draw bar, as easily as drawing a luggage case. The draw bar can be a telescopic bar.

In the other embodiment of the present invention, the draw bar can be a hollow tube. The seat post of the trolley-like folding bicycle of the present invention can be dismounted and then connected to the hollow tube such that the trolley-like folding bicycle can be drawn with simply the draw bar.

DETAILED DESCRIPTION OF THE PREFERRED EMBODIMENT

Figure 1:
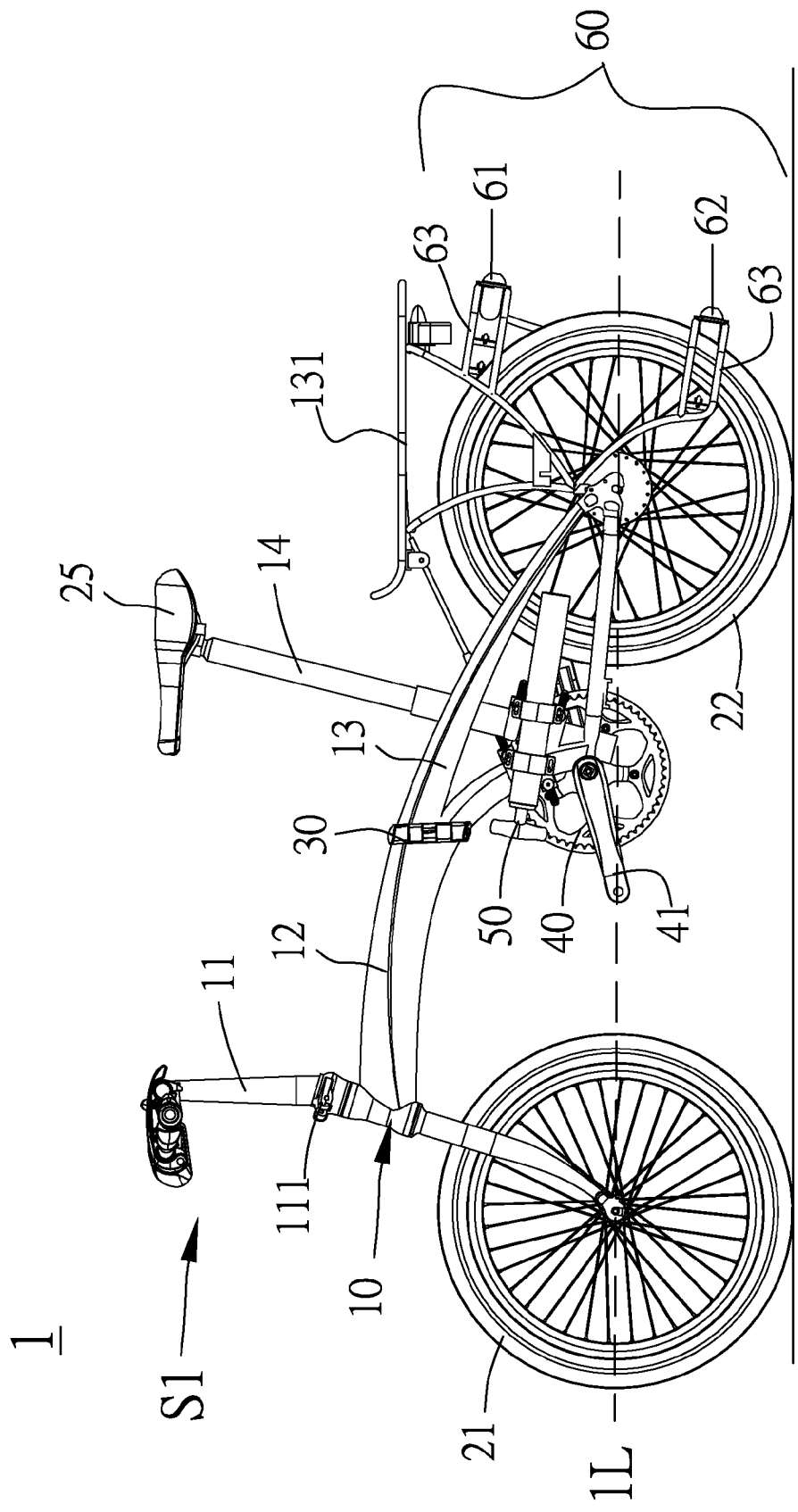
FIG. 1 is a lateral view of a first embodiment of the present invention in a usage state.
Figure 2:
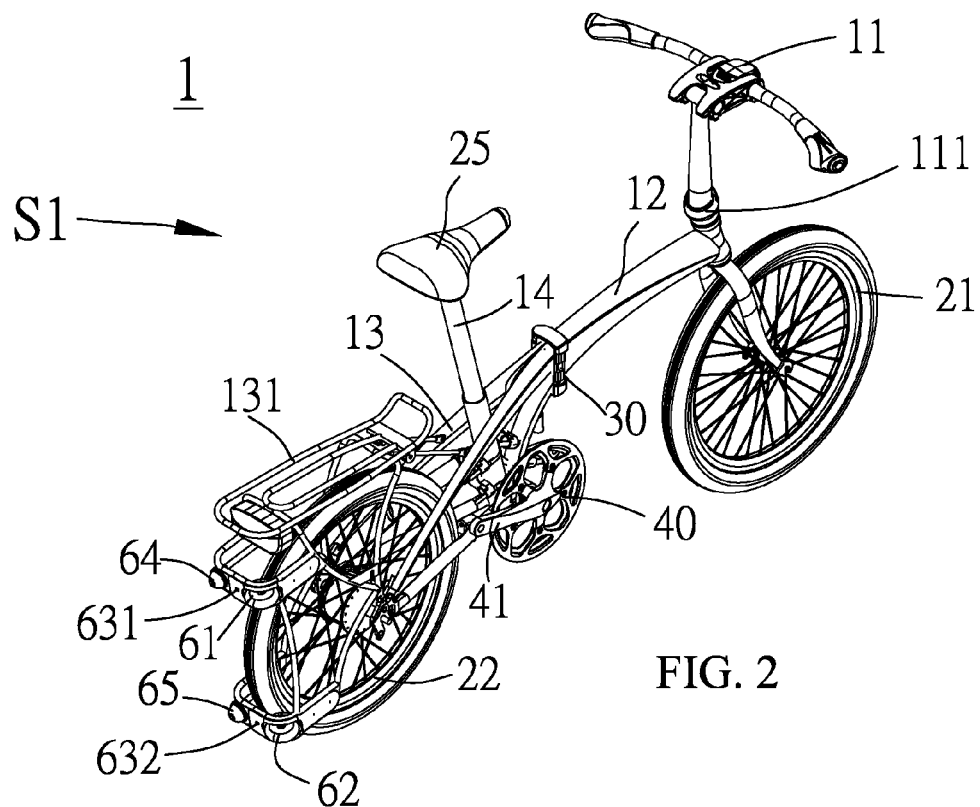
FIG. 2 is a schematic drawing of the first embodiment of the present invention in the usage state.
Figure 3:
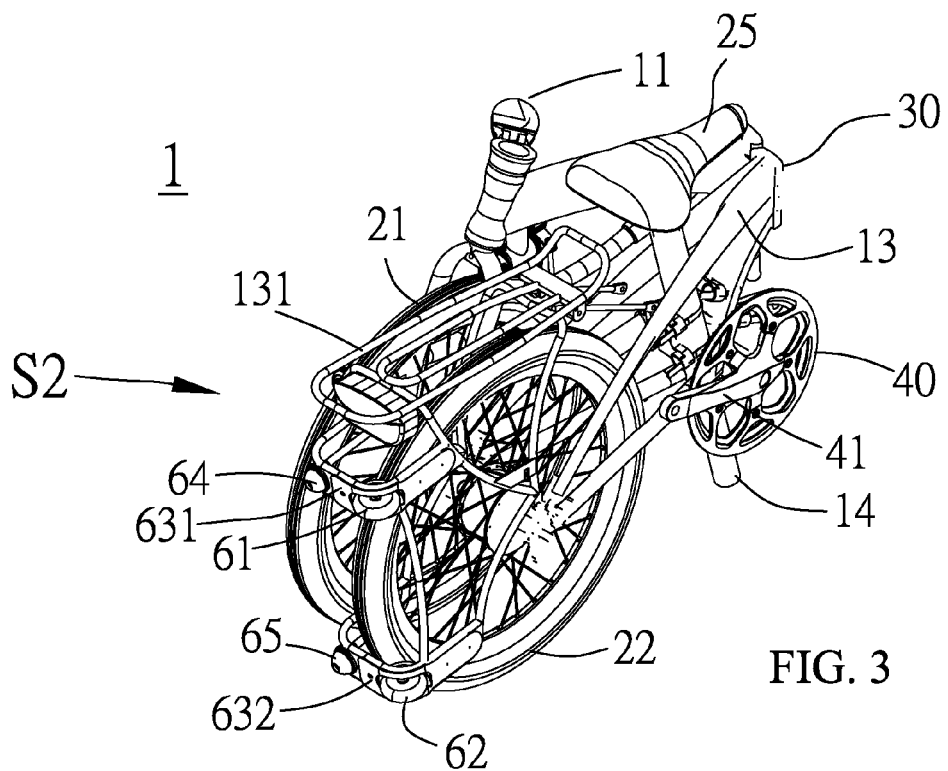
FIG. 3 is a schematic drawing of the first embodiment of the present invention in a folded state.

The advantages and innovative features of the invention will become more apparent from the following detailed description when taken in conjunction with the accompanying drawings.

Please refer to FIGS. 1~6 regarding a first embodiment of a trolley-like folding bicycle 1 of the present invention. The trolley-like folding bicycle 1 of the present invention mainly comprises a bicycle frame 10, a front wheel 21, a rear wheel 22, a saddle 25, a folding device 30, a transmission gear 40, a draw bar 50, and a draw wheel set 60 assembled along a bicycle body axis 1L. The feature of the present invention is to enable the bicycle body of the folded trolley-like folding bicycle 1 to be drawn like a trolley via the design of the draw bar 50 and the draw wheel set 60. In this embodiment, the draw bar 50 is a telescopic bar for drawing the folded trolley-like folding bicycle 1. The draw wheel set 60 comprises a first small wheel 61, a second small wheel 62, and a draw frame 63. Both the first small wheel 61 and the second small wheel 62 are on the same side as the rear wheel 22. After the trolley-like folding bicycle 1 is folded, the first small wheel 61 and the second small wheel 62 can replace the front wheel 21 and the rear wheel 22 and roll such that the bicycle body moves.

The bicycle frame 10 of the trolley-like folding bicycle 1 comprises a control frame 11, a front half frame 12, a rear half frame 13, and a seat post 14. The control frame 11 is for controlling the direction of travel of the trolley-like folding bicycle 1 and is connected to the front half frame 12 and the front wheel 21. The rear half frame 13 is connected to the seat post 14 and the rear wheel 22. When the trolley-like folding bicycle 1 is being folded, the seat post 14 can be arranged in the bicycle body vertically. A transmission gear 40 is connected to the rear half frame 13 and the rear wheel 22. The transmission gear 40 comprises a pedal mechanism 41. However, the transmission gear 40 is a well known apparatus and is not the primary issue of the present invention, and so it is not elaborated upon. Moreover, the draw bar 50 and the draw wheel set 60 are respectively connected to the rear half frame 13. The rear half frame 13 further has a rear seat frame 131 for being connected to the draw frame 63.

Figure 5:
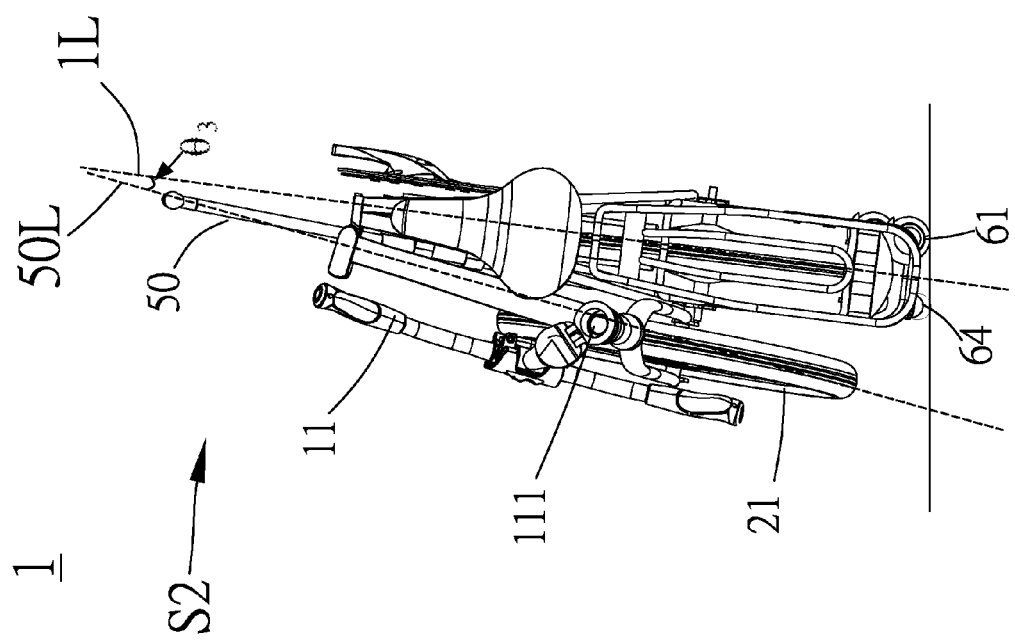
FIG. 5 is a lateral view of the first embodiment of the present invention in the usage state.

In addition, another feature of the present invention is that the draw wheel set 60 of the trolley-like folding bicycle 1 has a first cushion block 64 and a second cushion block 65, and the draw frame 63 has a first U-shaped frame 631 and a second U-shaped frame 632. The first U-shaped frame 631 and the second U-shaped frame 632 are connected to the rear seat frame 131. The first small wheel 61 and the first cushion block 64 are located at the first U-shaped frame 631. The second small wheel 62 and the second cushion block 65 are located at the second U-shaped frame 632. As shown in FIG. 5, in order to facilitate drawing the trolley-like folding bicycle 1, the first small wheel 61 and the second small wheel 62 are respectively located on the same side as the first U-shaped frame 631 and the second U-shaped frame 632. The first cushion block 64 located at the first U-shaped frame 631 is adjacent to the first small wheel 61. The second cushion block 65 located at the second U-shaped frame 632 is adjacent to the second small wheel 62.

With the design of the first U-shaped frame 631, the second U-shaped frame 632, the first cushion block 64, and the second cushion block 65, another object of the present invention can be achieved; that is, to allow the trolley-like folding bicycle 1 to stop during the drawing or to be placed stably alone on the ground. Because the first cushion block 64 and the second cushion block 65 can provide support, they can share the bearing of the weight of the whole trolley-like folding bicycle 1 together with the first small wheel 61 and the second small wheel 62. This is different from U.S. Pat. No. 7,591,473. In U.S. Pat. No. 7,591,473, four small wheels and the rear seat frame bear the weight of the whole bicycle directly. In the present invention, the function of the first cushion block 64 and the second cushion block 65 is not only to share the weight of the bicycle, but also to achieve the stability of the trolley-like folding bicycle 1 when the trolley-like folding bicycle 1 is upright (see FIG. 4). Moreover, with the design of the first U-shaped frame 631, the second U-shaped frame 632, the first cushion block 64, and the second cushion block 65, the trolley-like folding bicycle 1 can stand upright stably on the ground even in a usage state S1.

In addition, the front half frame 12 is connected to the rear half frame 13 via the folding device 30. The trolley-like folding bicycle 1 has two states: the usage state S1 (FIGS. 1 and 2) and a folded state S2 (FIGS. 3~6). When the front half frame 12 and the rear half frame 13 are folded via the folding device 30, the trolley-like folding bicycle 1 switches into the folded state S2. During the folding process, the front wheel 21 and the rear wheel 22 move closer to each other. The control frame 11 is folded and then located on the other side of the front wheel 21 via the handlebar frame folding mechanism 111. The folding function is well known and is not the primary issue of the present invention, and so it is not elaborated upon. In this embodiment, in the folded state S2, the draw bar 50 is located between the front wheel 21 and the rear wheel 22 (shown in FIG. 5). Thus the draw bar 50 will not increase significantly the volume of the trolley-like folding bicycle 1 in the folded state S2.

Figure 4:
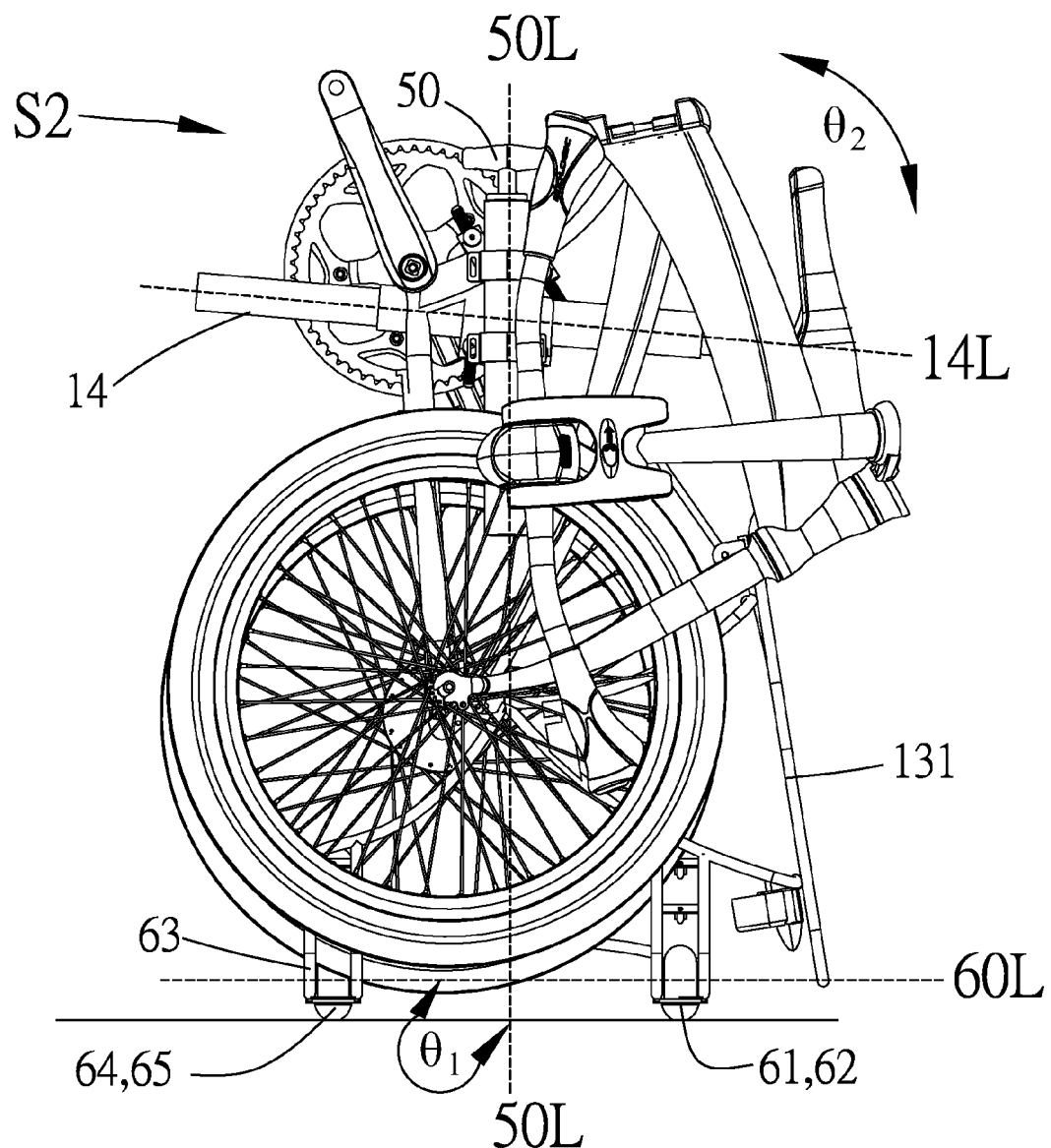
FIG. 4 is a lateral view of the first embodiment of the present invention in the folded state.

The object of the present invention is to allow the trolley-like folding bicycle 1 in the folded state S2 to be easily drawn like a luggage case. To achieve the object, after the trolley-like folding bicycle 1 is folded (see FIG. 3), a user puts it upright, as shown in FIG. 4. The draw bar axis 50L formed with the draw bar 50 should be substantially perpendicular to the draw rotation axis 60L formed with the first small wheel 61 and the second small wheel 62; that is to say, the included angle $\theta_1$ formed by the draw bar axis 50L and the draw rotation axis 60L is substantially 90 degrees. To put the trolley-like folding bicycle 1 upright and draw it when it is upright is one of the primary issues of the present invention. In order to show the feature of "upright", when the trolley-like folding bicycle 1 is in the folded state S2 for being drawn, the seat post 14 forms a seat post axis 14L. The included angle $\theta_2$ formed by the seat post axis 14L and the draw bar axis 50L is 60~120 degrees.

Turning the trolley-like folding bicycle 1 from the horizontal to the vertical makes the first small wheel 61 and the second small wheel 62 contact the ground, so as to help the bicycle body move. In addition, another advantage of turning the trolley-like folding bicycle 1 from the horizontal to the vertical is that moving the trolley-like folding bicycle 1 becomes easier and more convenient. The lateral length of a common folded folding bicycle is usually greater than the height. If the bicycle is drawn in this state, the bicycle may be cumbersome due to the greater lateral coverage area of the bicycle. Conversely, if the bicycle is turned from the horizontal to the vertical, the lateral length of the bicycle is smaller than the height. Thus the aforementioned problem can be solved. Therefore, in the present invention, the folded trolley-like folding bicycle 1 is drawn vertically to meet the need in practical use.

Figure 6:
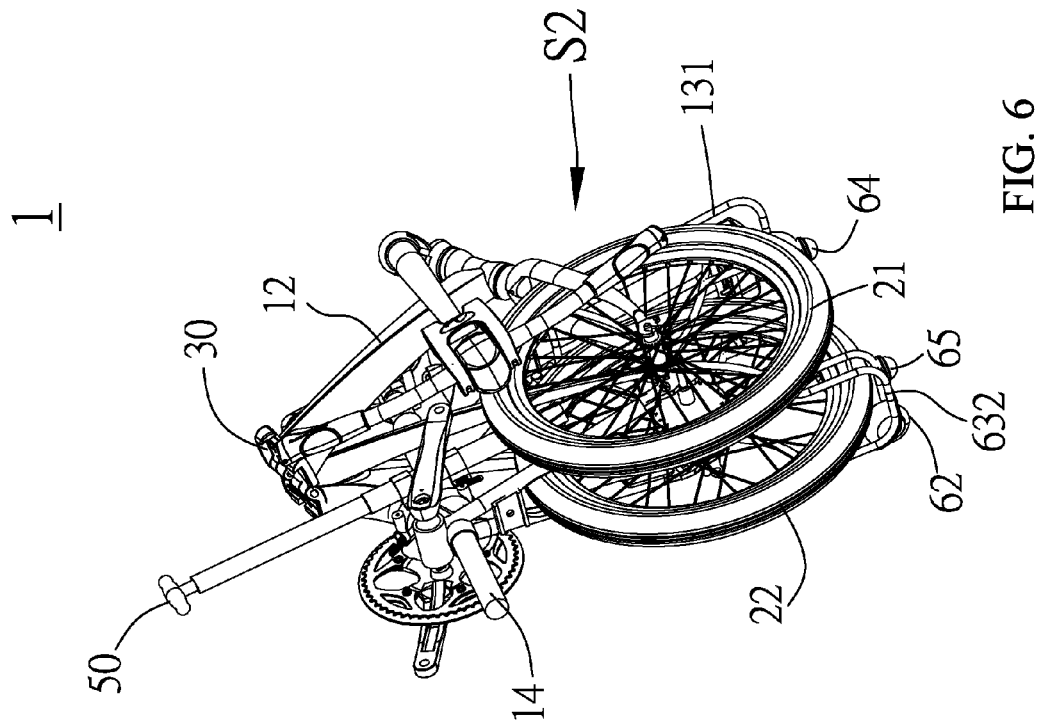
FIG. 6 is a schematic drawing of the first embodiment of the present invention in the usage state.

As shown in FIGS. 5 and 6, in this embodiment, the draw bar 50 is a telescopic tube 50 able to be lengthened and shortened. When the user is going to draw the trolley-like folding bicycle 1, he or she may lengthen the draw bar 50 so as to draw the trolley-like folding bicycle 1. The draw bar axis 50L and the bicycle body axis 1L form an included angle $\theta_3$. The included angle $\theta_3$ is preferably not too wide. An angle between 0~35 degrees is recommended. In addition, the rolling direction of the first small wheel 61 and the second small wheel 62 is perpendicular to the rolling direction of the front wheel 21 and the rear wheel 22. Although this feature is the same as the rolling direction of the two small wheels in U.S. Pat. No. 7,431,270, the user does not have to fold the rear seat frame to allow the first small wheel 61 and the second small wheel 62 to contact the ground in the present invention, which is more convenient for the use and the operation of the folded trolley-like folding bicycle 1.

Figure 7:
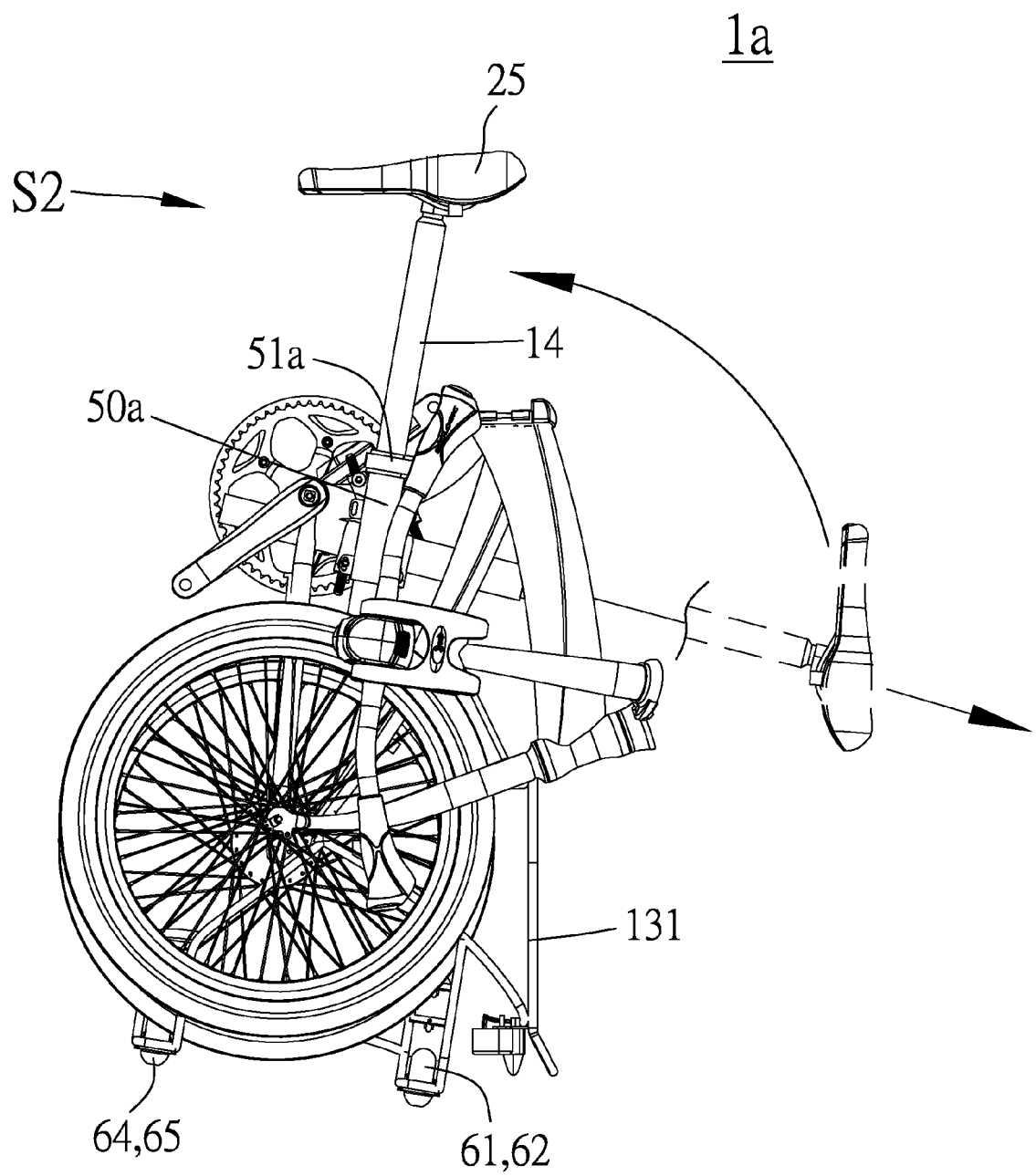
FIG. 7 is a schematic drawing showing dismounting a seat post according to a second embodiment of the present invention.
Figure 9:
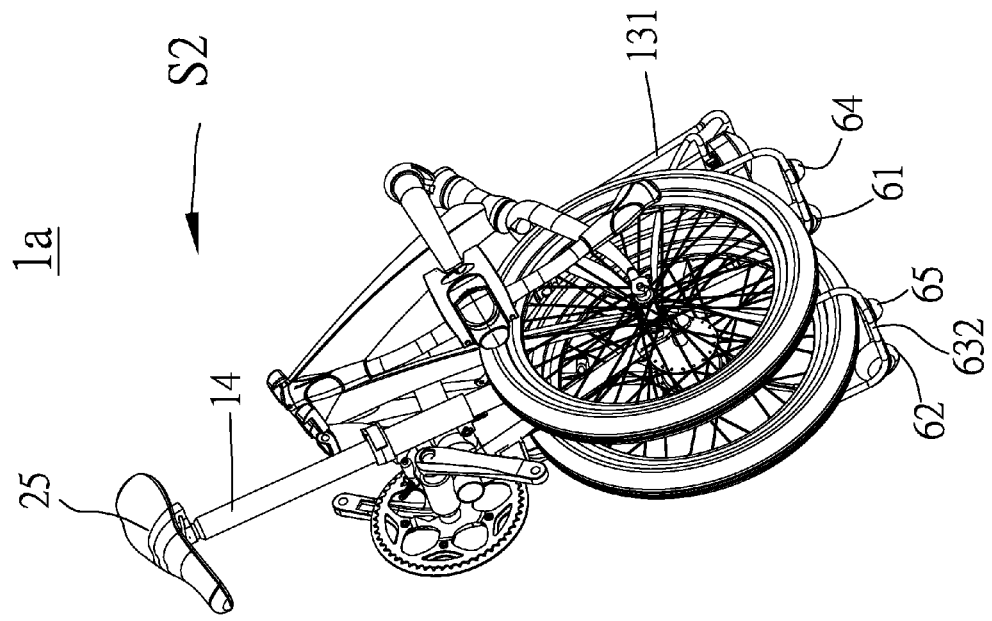
FIG. 9 is a schematic drawing of the second embodiment of the present invention in the usage state.
Figure 8:
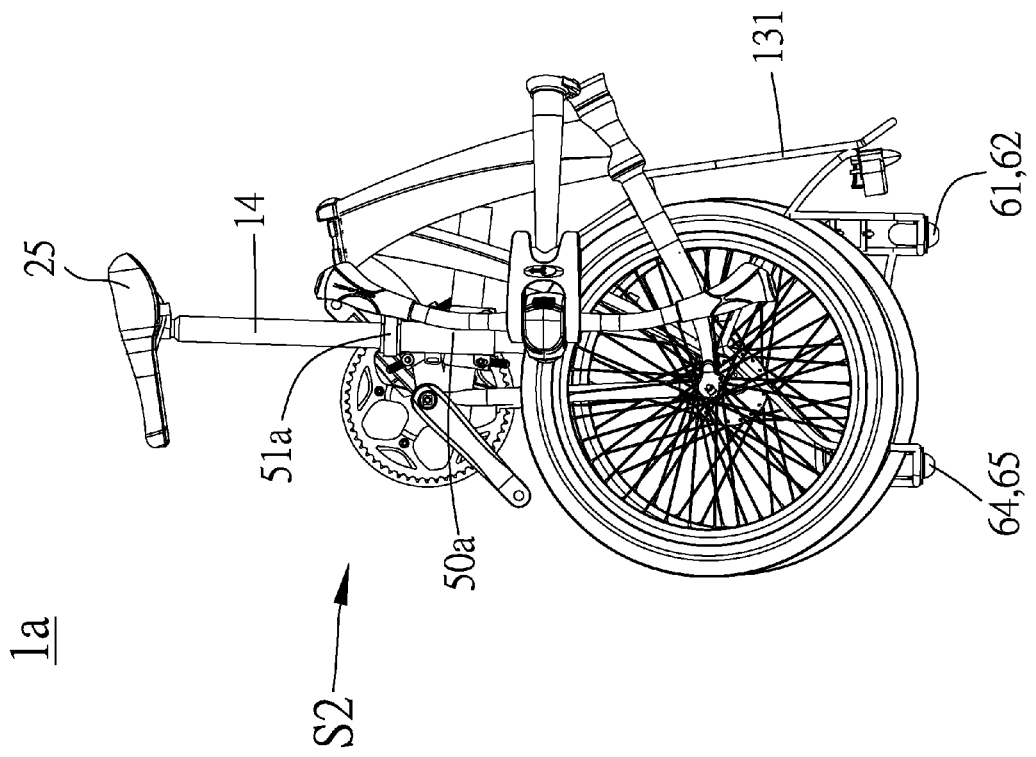
FIG. 8 is a lateral view of the second embodiment of the present invention in a usage state.

Please refer to FIGS. 7~9 regarding a second embodiment of a trolley-like folding bicycle 1 of the present invention. The major difference between the first and the second embodiments of the present invention is that the bicycle frame 10 of a trolley-like folding bicycle 1a has a quick release clamp (not shown), and the draw bar 50 has a quick release clamp 51a. Moreover, the draw bar 50 of this embodiment is a hollow tube 50a.

In this embodiment, the trolley-like folding bicycle 1a has a quick release clamp (not shown) between the bicycle frame 10 and the seat post 14 for dismounting the seat post 14. Also, the hollow tube 50a has the quick release clamp 51a to allow the dismounted seat post 14 to be connected to the hollow tube 50a. As shown in FIG. 7, when the seat post 14 is connected to the hollow tube 50a, the seat post 14 and the hollow tube 50a can replace the telescopic draw bar 50 of the first embodiment and allow the user to draw the trolley-like folding bicycle 1a. Its usage state is shown in FIGS. 8 and 9.

The details of the operation of each component of the trolley-like folding bicycle 1a are the same as the first embodiment and thus are not elaborated upon.

In conclusion, because of the draw bar 50 and the draw wheel set 60 of the trolley-like folding bicycle 1 of the present invention, the trolley-like folding bicycle 1 in the folded state S2 can be drawn like a luggage case. Moreover, the user only has to fold the trolley-like folding bicycle 1 and put the bicycle body upright to draw the trolley-like folding bicycle 1, which is very convenient for use.

It is noted that the above-mentioned embodiments are only for illustration. It is intended that the present invention cover modifications and variations of this invention provided they fall within the scope of the following claims and their equivalents. Therefore, it will be apparent to those skilled in the art that various modifications and variations can be made to the structure of the present invention without departing from the scope or spirit of the invention.

What is claimed is:

1. A trolley folding bicycle, comprising a bicycle frame, a front wheel, a rear wheel, a saddle, a folding device, and a transmission gear assembled along a bicycle body axis, wherein the bicycle frame comprises a control frame, a front half frame, a rear half frame, and a seat post, the control frame being connected to the front half frame and the front wheel, the rear half frame being connected to the seat post and the rear wheel, the transmission gear being connected to the rear half frame and the rear wheel, the folding device connecting the front half frame and the rear half frame and enabling the front half frame and the rear half frame to be folded such that the front wheel and the rear wheel move closer to each other, via the operation of the folding device, the trolley folding bicycle having a usage state and a folded state, characterized in that the trolley folding bicycle further comprises:

a draw bar connected to the bicycle frame; and a draw wheel set comprising a first small wheel, a second small wheel, and a draw frame, the draw frame being connected to the rear half frame, the first small wheel and the second small wheel being connected to the draw frame;

wherein when the trolley folding bicycle is in the folded state for being drawn, the draw bar forms a draw bar axis, the first small wheel and the second small wheel forms a draw rotation axis, and the draw bar axis is substantially perpendicular to the draw rotation axis.

2. The trolley folding bicycle as claimed in claim 1, wherein when the trolley folding bicycle is in the folded state for being drawn, the seat post forms a seat post axis, and an included angle formed by the seat post axis and the draw bar axis is 60 to 120 degrees.

3. The trolley folding bicycle as claimed in claim 2, wherein when the trolley folding bicycle is in the folded state for being drawn, the first small wheel and the second small wheel are on the same side as the rear wheel.

4. The trolley folding bicycle as claimed in claim 3, wherein an included angle formed by the draw bar axis and the bicycle body axis is 0 to 35 degrees.

5. The trolley folding bicycle as claimed in claim 4, wherein when the trolley folding bicycle is in the folded state, the draw bar is located between the front wheel and the rear wheel.

6. The trolley folding bicycle as claimed in claim 5, wherein the draw bar is connected to the rear half frame.

7. The trolley folding bicycle as claimed in claim 6, wherein the rear half frame further comprises a rear seat frame, and the draw frame is connected to the rear seat frame.

8. The trolley folding bicycle as claimed in claim 7, wherein the draw frame further comprises a first U-shaped frame and a second U-shaped frame.

9. The trolley folding bicycle as claimed in claim 8, wherein the first small wheel is located at the first U-shaped frame, and the second small wheel is located at the second U-shaped frame, wherein the first small wheel and the second small wheel are respectively located on the same side as the first U-shaped frame and the second U-shaped frame.

10. The trolley folding bicycle as claimed in claim 9, wherein the draw wheel set further comprises a first cushion block and a second cushion block, and the first cushion block and the second cushion block are respectively located at the first U-shaped frame and the second U-shaped frame, such that when the trolley folding bicycle is in the folded state, the trolley folding bicycle stands via the first cushion block, the second cushion block, the first small wheel, and the second small wheel.

11. The trolley folding bicycle as claimed in claims 10, wherein the draw bar is a telescopic bar.

12. The trolley folding bicycle as claimed in claims 10, wherein the draw bar is a hollow tube.

13. The trolley folding bicycle as claimed in claim 12, wherein the seat post can be connected to the draw bar after being dismounted.

14. The trolley folding bicycle as claimed in claim 1, wherein the draw bar has a quick release clamp, and the quick release clamp is for dismounting the seat post.

15. The trolley folding bicycle as claimed in claims 2, wherein the draw bar is a telescopic bar.

16. The trolley folding bicycle as claimed in claims 3, wherein the draw bar is a telescopic bar.

17. The trolley folding bicycle as claimed in claims 4, wherein the draw bar is a telescopic bar.

18. The trolley folding bicycle as claimed in claims 7, wherein the draw bar is a telescopic bar.

19. The trolley folding bicycle as claimed in claims 2, wherein the draw bar is a hollow tube.

20. The trolley folding bicycle as claimed in claims 3, wherein the draw bar is a hollow tube.

* * * * *